United States Patent [19]
Wardavoir

[11] Patent Number: 5,393,094
[45] Date of Patent: Feb. 28, 1995

[54] VEHICLE STEERING COLUMN, PARTIALLY MOVABLE BETWEEN A UTILIZATION POSITION AND A RETRACTED POSITION

[75] Inventor: Francois Wardavoir, Cellettes, France

[73] Assignee: Hobbycar, Thenay, France

[21] Appl. No.: 128,679

[22] Filed: Sep. 30, 1993

[30] Foreign Application Priority Data

Oct. 5, 1992 [FR] France .................. 92 11772

[51] Int. Cl.$^6$ .................. B62D 1/18; B60N 2/20
[52] U.S. Cl. .................. 280/775; 280/639
[58] Field of Search .................. 280/775, 777, 639; 180/90

[56] References Cited

U.S. PATENT DOCUMENTS

| | | | |
|---|---|---|---|
| 2,549,925 | 4/1951 | Paton | 280/775 |
| 3,561,282 | 2/1971 | Hershmann et al. | 280/775 |
| 3,613,477 | 10/1971 | Heise | 280/775 |
| 4,089,542 | 5/1978 | Westerman | 280/639 |
| 4,114,719 | 9/1978 | Saunders | 180/90 |

FOREIGN PATENT DOCUMENTS

| | | |
|---|---|---|
| 0424783 | 5/1991 | European Pat. Off. . |
| 411743 | 4/1909 | France . |
| 2620395 | 3/1989 | France . |
| 1919405 | 4/1969 | Germany . |

*Primary Examiner*—Kenneth R. Rice
*Attorney, Agent, or Firm*—Young & Thompson

[57] ABSTRACT

Part (1, 2, 3, 4, 5, 6, 7) of the column comprising the steering wheel (1) is movable between a utilization position and a retracted position in which the steering column occupies a reduced volume of the vehicle passenger compartment. The seat of the driver of the vehicle comprises a back, part of which is movable between a service position and a position inclined forward. The steering column comprises connection structure (16, 17, 19, 9, 12) connecting it to the movable part of the seat back and making it possible to control the movement of the movable part (1, 2, 3, 4, 5, 6, 7) of the steering column by the operation of the movable part of the seat back. Use in particular for convertible vehicles.

4 Claims, 1 Drawing Sheet

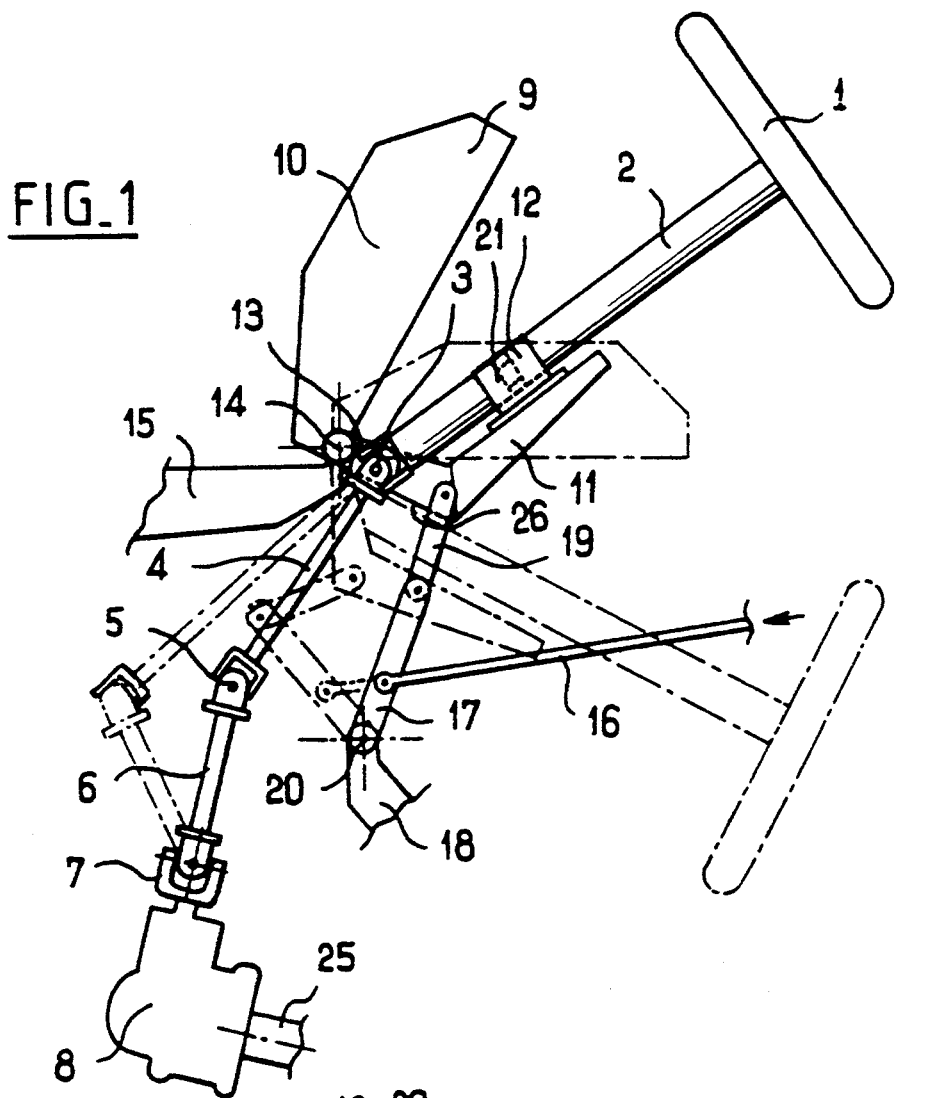
FIG_1
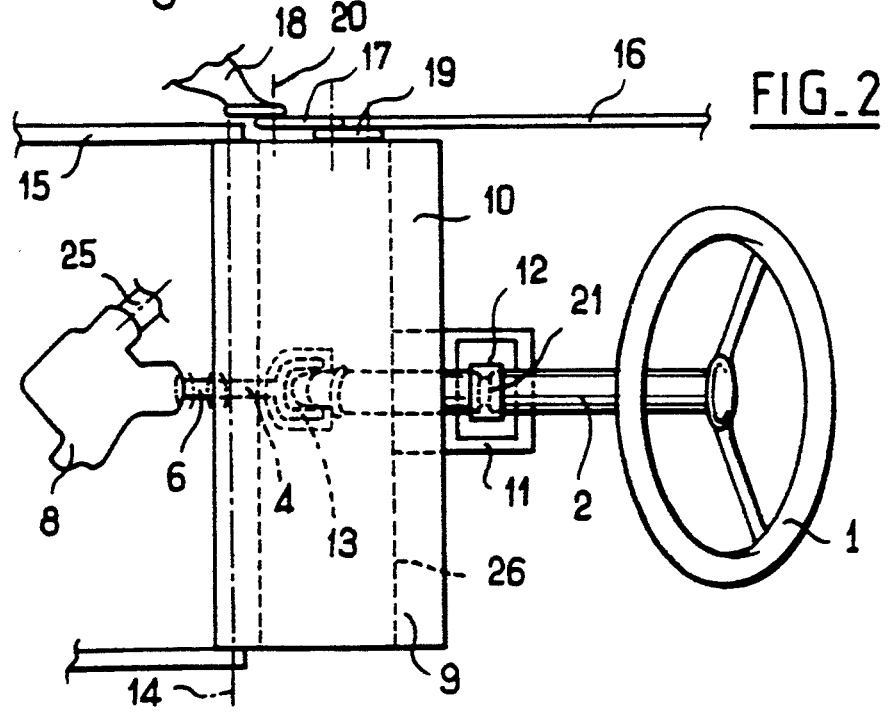
FIG_2

VEHICLE STEERING COLUMN, PARTIALLY MOVABLE BETWEEN A UTILIZATION POSITION AND A RETRACTED POSITION

FIELD OF THE INVENTION

The present invention relates to a vehicle steering column, part of this column, comprising the steering wheel, being movable between a utilization position and a retracted position.

PRIOR ART

It is known to fit some motor vehicles, for example sports vehicles, with a steering column capable, when the vehicle is not used, of being moved or folded so as to occupy a reduced volume of the passenger compartment. A column of this type is in particular described in French Patent no 2,620,395 dated 6th Jul. 1990 in the name of the present applicant, which relates to an open air vehicle with seat backs capable of being turned down.

The principle of a retractable steering column being known, many implementation problems remain open or have not been solved in a satisfactory manner.

The direct manual movement of the column is often difficult, as much for the guiding of the movement of the column as for the length of the travel and the final retracted position of the column. Moreover, the possibility of retracting the column must not affect the precision and the ease of normal handling of the latter in the utilization position for steering the vehicle.

SUMMARY OF THE INVENTION

In order to meet all these imperatives, the present invention provides a vehicle steering column, part of this column comprising the steering wheel being movable between a utilization position and a retracted position in which the steering column occupies a reduced volume of the passenger compartment of the vehicle, the seat of the driver of the vehicle comprising a back, part of which is movable between a service position and a position substantially inclined forward.

According to the invention, the steering column is connected to the movable part of the said back by connection means making it possible to control the displacement of the movable part of the steering column through the operation of the movable part of said back.

The movement of the steering column is thus rendered dependent on the movement of the movable part of the back of the seat. In this manner, the guiding of the column is controlled and the final position of the latter is invariable.

Moreover, the turning down of the movable part of the back of the seat is in general effected without effort, using the force of gravity by allowing the movable part of the back to fall forward. The invention therefore makes it possible to use part of this same force in order to retract the column without any effort.

According to an advantageous version of the invention, said connection means comprise an element of the dashboard of the vehicle, this element being retractable and rigidly attached to the retractable part of the column.

There are thus placed jointly in retracted position a part of the steering column and an element of the dashboard, which is thus protected, particularly from impacts.

BRIEF DESCRIPTION OF THE DRAWINGS

Other features and advantages of the invention will become more apparent in the following description, of an embodiment of the invention, considered in conjunction with the drawings appended as non-limiting examples and in which:

FIG. 1 is a view in elevation of the steering column according to the invention and of part of the dashboard of the vehicle;

FIG. 2 is a plan view of the device of FIG. 1.

DESCRIPTION OF THE PREFERRED EMBODIMENTS

The steering column according to the invention is intended for a motor vehicle. In FIGS. 1 and 2 it comprises a steering wheel 1 of conventional circular shape rigidly secured to the end of a bar 2 connected through its other end to a first universal joint 3.

The joint 3 transmits the rotational movement of the steering wheel 1 to an upper rod 4 connected to a second universal joint 5. The latter transmits said movement to a lower rod 6 which is in turn connected to a third universal joint 7. Through the intermediary of the latter, the rotational movement reaches the gearing 8, not detailed in the figures, which redirects the movement in the direction of a mechanism, not shown, connected to the rack governing the steering of the wheels of the vehicle. The elements of the column situated above the gearing 8 can be substantially situated in the same vertical plane parallel to the longitudinal axis of the vehicle.

The part of the steering column situated above the universal joint 7, namely the steering wheel 1, the bar 2, the rods 4 and 6 and the universal joints 3 and 5, is retractable, that is to say is movable between a utilization position and a retracted position in which the steering column occupies a reduced volume of the passenger compartment of the vehicle.

The support of the gearing 8 is secured rigidly to the chassis of the vehicle.

Furthermore, the bar 2 is connected to an element 9 of the dashboard of the vehicle. This element 9 comprises an elongate rectangular shell 10, the long edges of which are perpendicular to the vertical plane of the steering column. Dials and indicators for monitoring, or control buttons, associated with various functions of the vehicle may be disposed inside the shell 10 or on the latter, within view of the driver.

On one of the lower long edges of the shell 10 is found an angled extension forming an integral part of the shell 10 and extending substantially underneath the latter. This extension consists of a wide portion 26 and of a narrow portion 11.

The connection of the bar 2 with the narrow portion 11 is effected by virtue of a part 12 in the form of a half-tube which grips the bar 2 and maintains the latter against the surface of the narrow portion 11 so that the bar 2 is free in rotation about the axis of the half-tube so as to transmit the movements imparted to the steering wheel by the driver. Inside the part 12, a stop, not shown, is engaged in an annular recess 21 made on the periphery of the bar 2 in order to prevent the translation of the latter.

An aperture 13 is made in the wide portion 26, permitting the passage of the steering column through the element 9 approximately at the level of the universal joint 3.

The element 9 is articulated in rotation about the spindle 14 perpendicular to the vertical plane of the steering column to a fixed element 15 of the passenger compartment of the vehicle.

By means of this spindle 14 and of the connection with the bar 2, the element 9 is rigidly attached to the retractable part of the column.

The back of the driver's seat comprises, as is usual, an upper part movable between a service position in which the driver can sit on the seat and a position in which said movable part is turned down forward to the horizontal. Such a seat appears in the above-mentioned French patent.

A connecting rod 16 is articulated in rotation to the frame of this movable part on the right side of the latter, that is to say on the side of the central longitudinal axis of the vehicle. The connecting rod 16 is also articulated to the central part of a first link 17. By one end, the latter is articulated in rotation about the spindle 20 to a fixed element 18 of the passenger compartment. By its other end, the link 17 is articulated to the end of a second link 19. The other end of the link 19 is articulated in rotation to the right side of the wide portion 20 of the element 9.

As seen in FIG. 2, the rod 16 is on the right of the driver. It does not then in any way impede his/her freedom of movement, whether in order to drive the vehicle or to enter and leave the latter.

The present embodiment of the invention applies particularly to a convertible motor vehicle, the passenger side of which comprises four passenger spaces, as appears in the above-mentioned French patent no 2,620,395. In the latter, the rear of the movable part of the back of each seat forms a door coming to blank off the upper part of the passenger space when this movable part is turned down to the horizontal.

The device according to the invention operates in the following manner.

The fixed points constituting the axes of rotation of the retraction mechanism are the universal joint 7, the spindle 14 and the spindle 20, both parallel and coplanar.

The driver's seat is assumed to be in the service position, that is to say that the movable part of the back is substantially vertical. The steering column is in the utilization position. This situation is shown in solid lines in FIG. 1.

The movements which will now be described take place simultaneously. In order to retract the steering column, the movable part of the back of the seat is tilted toward the front of the vehicle, to the horizontal. In FIG. 1, this brings about the movement of the rod 16 toward the left and the rotation of the link 17 in the anticlockwise direction. The latter drives the link 19 and brings about the rotation of the element 9 in the clockwise direction, about the spindle 14. The bar 2 and the steering wheel 1 are carried along in the same rotational movement about the spindle 14. The rod 4 is pushed towards the front of the vehicle and the rod 6 is moved in rotation about the universal joint 7. The situation of the components in the retracted position is shown in broken lines in FIG. 1.

The bar 2 and the steering wheel 1 are therefore no longer visible at the upper part of the vehicle. Moreover, the shell 10 of the element 9 of the dashboard is turned down to the horizontal, protecting from impacts the components with which its inner part is fitted.

The placing of the steering column and of the element 9 in retracted position takes place in a moment and without effort. In fact, it is sufficient for this to tilt the movable part of the back of the seat forward. The operation lasts the time of the forward fall of this movable part. The forces necessary for moving the column and the element 9 are provided by the weight of this movable part tilting forward.

In order to replace the steering column and the element 9 in the utilization position, it is sufficient to lift again the movable part of the back of the seat. All the parts then return to their initial position by passing along their trajectory in the opposite direction.

The column according to the invention therefore permits the steering column and the element 9 to be placed in the utilization position or in the retracted position, instantaneously and without effort. Since the manual operation of the column is not direct but is effected through the intermediary of a mechanism, said column is each time placed precisely in the optimal position.

In conjunction with these advantages, the vertical travel of the bar 2 and of the steering wheel 1 is very long and frees a considerable volume in the upper part of the vehicle.

In the case of the vehicle described in the above-mentioned French patent no 2,620,395, once the steering column is retracted and the movable parts of the backs of the seats are turned down to close the passenger spaces, a wide loading floor is available at the upper part of the vehicle.

Numerous modifications and improvements may be made to the invention without going beyond its scope. It will be possible for example to modify the connection between the movable part of the back of the seat and the steering column or else to vary the number and shape of the movable parts of the steering column.

I claim:

1. A vehicle steering column, part (1, 2, 3, 4, 5, 6, 7) of this column, comprising the steering wheel (1), being movable between a utilization position and a retracted position in which the steering column occupies a reduced volume of the passenger compartment of the vehicle, wherein the steering column comprises mechanical connection means (16, 17, 19, 9, 12) adapted for kinetically connecting it to the movable part of a seat back, part of which seat back is movable between an upright service position and a forwardly inclined out-of-service position and making it possible to displace the movable part (1, 2, 3, 4, 5, 6, 7) of the steering column from said utilization position to said retracted position by movement of the movable part of said seat back from said upright service position to said forwardly inclined out-of-service position.

2. The steering column as claimed in claim 1, wherein an element (9) of the dashboard of the vehicle is retractable and rigidly attached to the movable part (1, 2, 3, 4, 5, 6, 7) of the column.

3. The steering column as claimed in claim 2, wherein said element (9) of the dashboard is articulated in rotation to a fixed element (15) of the passenger compartment.

4. The steering column as claimed in claim 1, wherein said connection means (16, 17, 19, 9, 12) also comprise a connecting rod (16), a first end of which is articulated in rotation to the movable part of said back, a first link (17) connected to the second end of said connecting rod (16) and articulated in rotation to a fixed element (18) of the passenger compartment and a second link (19) articulated to the first link (17) and to said element (9) of the dashboard.

* * * * *